Jan. 6, 1959
D. A. SUTTON
2,867,042
GEOMETRICAL INSTRUMENTS
Filed Aug. 26, 1955
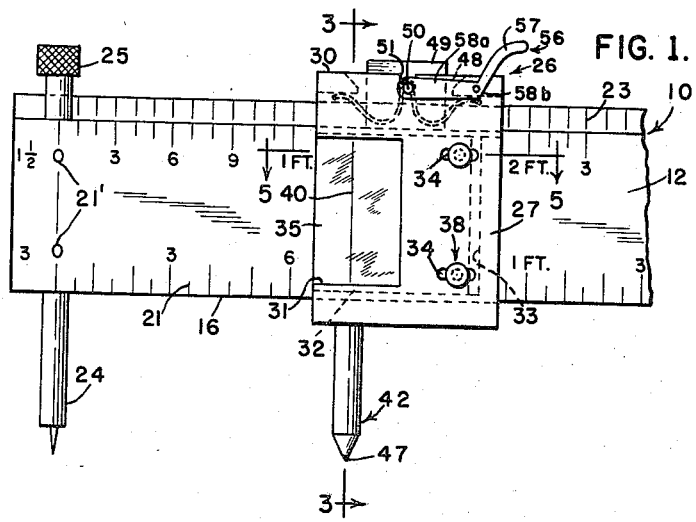
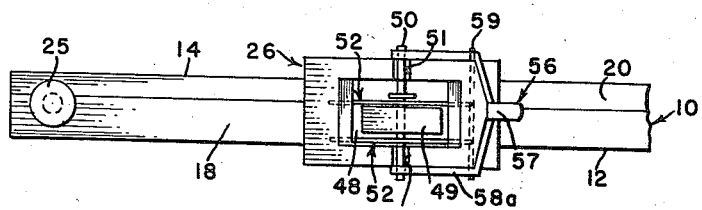
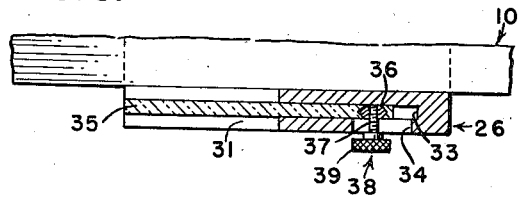
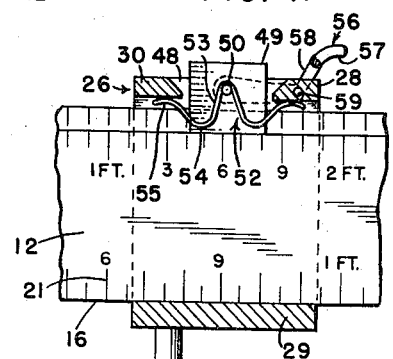
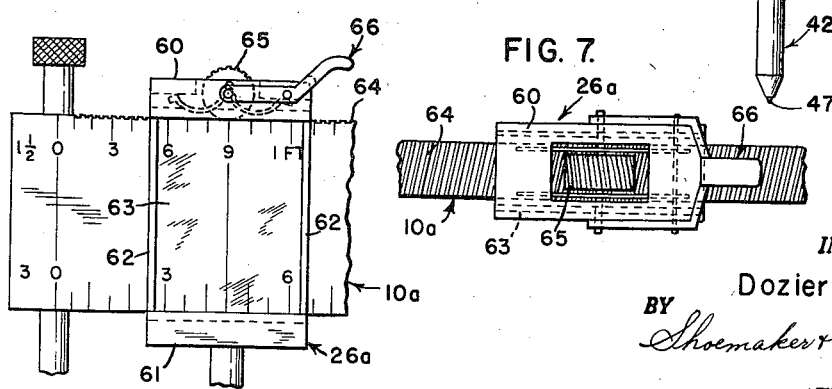
INVENTOR.
Dozier A. Sutton
BY Shoemaker & Mattare
ATTORNEYS

United States Patent Office 2,867,042
Patented Jan. 6, 1959

2,867,042

GEOMETRICAL INSTRUMENTS

Dozier A. Sutton, Warwick, Va.

Application August 26, 1955, Serial No. 530,725

12 Claims. (Cl. 33—158)

This invention relates to the class of geometrical instruments and particularly to an instrument of the nature of the beam compass which incorporates a direct reading scale and may be more appropriately called a beam scale.

In the laying out of a drawing, of either small size or large size, it is customarily the practice to mark off dimensions on the drawing paper along a line usually from a reference point, by employing a linear scale and a pencil. The draftsman positions the scale on the drawing paper and marks off his dimensions on the paper along the scale with a pencil which is held in one hand while holding the scale in position with the other. When using a small scale such as the conventional triangular scale the difficulty of locating the points where marks are to be made on the drawing paper is not particularly difficult but where a number of points are to be located and marked there is always a possibility of making an error by inadvertently moving the scale.

In laying out drawings of large size, especially in mold loft work where very large patterns are laid out, the location and marking of centers becomes more difficult and tedious. In this work where a conventional rule or scale is employed the draftsman must bend over in an uncomfortable position with his face close to the drawing paper in order to line up the scale divisions with a center line or in order to properly locate the scale divisions for marking the desired points on the drawing paper and because of having to work in this manner, errors are very likely to occur.

Also in mold loft work it is often necessary to lay off dimensions by using a tape. This requires the services of two persons, one to hold the free end of the tape in the desired position while the other one draws out the tape and marks off the dimensions therealong.

Having in mind the foregoing it is a particular object of the present invention to provide a new and novel geometrical instrument whereby the difficulties above outlined, associated with the laying off of linear dimensions on a sheet of drawing paper, in the making of drawings of all sizes, particularly large drawings, are overcome by the provision of a scale, of any desired length, having associated with it means for easily and quickly locating or selecting division points thereon and for accurately marking the drawing paper over which the scale is used in exact accordance with the selected division point.

Another object of the invention is to provide, in a manner as hereinafter set forth, an instrument of the character stated embodying a bar or beam having a scale of any desired character laid out thereon and longitudinally thereof, with means at the starting or zero point of the scale for maintaining the beam in a fixed position and other means on the beam, designed to be moved therealong for facilitating the accurate location of division points on the scale and for marking off the selected division point or division points on the drawing with reference to the zero point, to facilitate connecting a number of selected linearly spaced points by straight lines or for describing circles or striking arcs from the zero point, the making of the circles and striking of the arcs being effectible by the marking means.

The present invention embodies the use of a slide or cursor on a beam scale having means associated with it whereby it is held in position against accidental movement when an index line or hairline is aligned with a marking on the scale and having a marking element in the nature of a stylus which is axially aligned with the hairline for marking the selected dimension on a drawing over which the beam is positioned. It is known that means has heretofore been provided as a part of a slide or cursor structure in the form of a helical gear engaging the rack on which the slide is mounted for retaining the cursor or slide in set position. Such gear and rack are, however, always coupled together so that the adjustment of the slide on the beam cannot be made with any degree of rapidity. It is accordingly another object of the present invention to provide a new and novel means for maintaining the slide or cursor against accidental movement after it has been set, which means embodies an element carried by the slide for connection with the beam, which is so constructed and arranged that it may be easily and quickly disconnected from the beam so that the slide or cursor can be shifted with great rapidity longitudinally on the beam to the desired new position of adjustment.

More specifically the present invention contemplates the provision of a slide or cursor carrying an element for connecting it with the beam to hold it in set position, which element is movable on the cursor or slide toward and away from the beam and is constantly urged by spring means toward the beam but is shiftable against the action of such spring means by a finger operated lever so as to free the cursor for the desired quick adjustment movement.

Still another object of the invention is to provide in an instrument of the above described character, a slide or cursor having a hairline carrying transparent window or plate overlying the beam scale, with a novel marking stylus secured to the cursor for alignment with reference to the hairline, which stylus is in the form of a "liquid-graphite" or "liquid-lead" pencil which does not require sharpening like a conventional pencil lead and which, therefore, has its point always in accurate alignment with the stylus center and with the hairline overlying the scale.

A still further object of the invention is to provide, in a manner as hereinafter set forth, in a geometrical instrument of the type hereinbefore defined, a slide or cursor of novel design wherein the transparent plate or window is supported in a frame which is open on the side adjacent to the zero point of the beam scale and has the index line or hairline closely adjacent to the open side of the frame so that the cursor can be moved to bring the hairline into close relationship with the zero point of the scale and also no blocking out of the calibrations between the hairline and the zero point of the scale occurs.

A still further object of the invention is to provide in an instrument of the character described, a cursor having a hairline carrying transparent window or plate overlying the scale, which is adapted to be adjusted in the frame forming part of the body of the cursor, in the direction of the length of the scale to compensate for any slight misalignment which may come about between the hairline and the stylus connected with the cursor.

Other objects and advantages of the invention will become apparent as the description of the same proceeds and the invention will be best understood from a consideration of the following detailed description taken in connection with the accompanying drawing forming a part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Fig. 1 is a view in side elevation of a geometrical instrument constructed in accordance with one embodiment of the present invention.

Fig. 2 is a view in top plan of the slide or cursor with adjacent portions of the scale bar.

Fig. 3 is a transverse section taken substantially on the line 3—3 of Fig. 1.

Fig. 4 is a detail section taken substantially on the line 4—4 of Fig. 3.

Fig. 5 is a horizontal section taken substantially on the line 5—5 of Fig. 1 showing the means for adjusting the position of the transparent window in the body of the slide.

Fig. 6 is a view in side elevation of another embodiment of the invention, showing the invention as applied to a helical gear and rack means of maintaining the slide or cursor in set position.

Fig. 7 is a view in top plan on an enlarged scale of the cursor and adjacent portions of the scale bar.

Referring now particularly to the drawing reference will first be made to the embodiment of the invention as illustrated in Figs. 1 to 5.

In the figures above referred to the numeral 10 generally designates what will be termed for convenience of description as the scale bar. However, in referring to this element 10 as a "bar" it is not intended that this shall be taken to mean the body of any particular length, width or thickness or even, necessarily, a body of relative stiffness or rigidity or inflexibility. In other words, the word "bar" is used generically to define an elongate member or body along one or more surfaces of which scales or scale markings are laid out.

It is also to be understood that the invention is not limited to the use of any particular type of scale such as a linear scale for measuring off distances in feet, millimeters, or the like but may refer to any other mathematical scale or a scale of any other character.

Lexicographers define a "scale" both as anything graduated for use as a measure or rule and also the graduated markings upon the thing itself. Accordingly, while the member 10 will be referred to in the specification as a "bar" or a "scale bar" and the divisions indicated upon the bar will be referred to as a scale or scales, in the claims the use of the term "scale" will be understood to mean both the bar itself and the markings or divisions thereon unless otherwise specifically separately defined.

The bar 10 is here shown as having the two opposite side faces 12 and 14 and the under or bottom face 16.

The top of the bar 10, as shown in Fig. 3 has a flat face 18 joining the face 12 and having a width less than the width of the bottom face 16. The inner longitudinal side of this top face 18 merges with an inclined face 20 which extends upwardly and toward the face 14 which may be defined or referred to as the back face of the scale bar.

The faces 12 and 14 are provided with suitable scales or scale markings extending lengthwise thereof, the scale marking upon the front face 12 being designated 21. The opposite or back face 14 is also scaled in a suitable manner.

Likewise the bottom face may carry graduations (not illustrated) and the inclined forwardly directed face 20 may have a scale 23 formed therealong as shown.

At one end of the scale bar 10 there is secured to or in the under face 16 a pointed member 24 which may be permanent or semi-permanent and in line with this pointed member 24 there is mounted in the top face or surface 18 of the bar a swivel headed pin or post 25.

If the scale 21 is a foot scale, for example, the pointed member or pin 24 and the swivel headed post 25 are in line with the zero marking 21' of the scale.

The numeral 26 generally designates a slide or cursor mounted upon the scale bar for movement longitudinally therealong. This cursor, while it is here shown as being formed as a one-piece body fashioned to encircle the scale bar to engage snugly against the faces 12 and 14, the bottom face 16 and the top edge of the inclined face portion 20, may, if desired, be made in separate joined together pieces.

The slide or cursor comprises the front and back face panels 27 and 28 respectively which are joined between their bottom edges by the plate 29.

The top of the cursor or head connects the top parts of the panels 27 and 28 and is generally designated 30.

The spacing between the panels 27 and 28 is such as to snugly receive the thickness of the scale bar therebetween and the spacing between the bottom plate 29 and the head 30 is such as to snugly receive the scale bar between the top and bottom dimensions or the height thereof. Thus the cursor may slide smoothly on the scale bar as will be readily apparent and it can also be slipped off of the bar if it should be desired to use the latter in the nature of a conventional ruler.

Each of the panels 27 and 28 has a window recess cut therein as indicated at 31. This recess opens through the edge of the panel nearest to the zero end of the scale or, as shown in Fig. 1, the recess opens through the left side of the panel.

The top and bottom edges of each window opening 31 have formed therein the longitudinal guide slots 32 and from the inner side of each window opening the respective panel has a recess 33 cut therein, into the top and bottom part of which the adjacent top and bottom slots extend.

Adjacent to the rear portion of each recess, the panel into which it is cut has cut therethrough two short slots or elongated openings 34 for the purpose hereinafter set forth.

Each window opening 31 has positioned therein a transparent window pane 35. The top and bottom edges of each pane engage in the top and bottom slots 32 of the window opening and a portion of the pane extends back into the recess 33 as shown.

The window pane 35 has secured therein, adjacent to the back or inner edge, two threaded grommets of metal or other suitable material, which are designated 36. These metal grommets or rings 36 may be set into the material of the window 35 which may be glass, or clear plastic, as desired, so that the surfaces of the grommets or rings will be flush with the faces of the window plate or pane.

The grommets or threaded rings 36 are also vertically spaced so as to align with the vertically spaced slots or elongated openings 34 and each is suitably threaded to receive the threaded stem 37 of a binding screw 38 which extends through the adjacent slot or opening 34. As will be readily apparent by loosening the screws 38 the heads 39 thereof will be backed away from the adjacent panel face so that the window pane 35 can be adjusted in the direction of the length of the scale bar upon which the slide or cursor is mounted.

The window pane 35 carries the hairline 40 which extends in the direction transversely of the scale bar or which is vertical in the position of use. It will be readily apparent that this hairline is brought into position with respect to a selected marking upon the scale 21 to adjust the slide or cursor with respect to the zero point of the scale and to locate the about to be described stylus at the selected measured distance from the point 24 for making a reference marking or for scribing a circle or arc.

Since the window opening 31 of each of the panels is entirely open or unobstructed on one side, that is the left side as viewed in Fig. 1 and the side nearest to the zero point of the scale it will be seen that the scale markings between the hairline and the zero point of the scale can be seen at all times; thus enabling the user of the device to more accurately position the hair line with respect to the scale.

The bottom plate 29 of the cursor body has formed therein a socket 41 in which is fixed an end of a stylus which is generally designated 42. The stylus 42 is positioned adjacent to the left hand side of the cursor and the hairline 40 is located in line with or with reference to the axial center of the stylus when the axis of the stylus is perpendicular to the bottom side of the scale bar or to the bottom of the cursor. In any event, the hairline will be adjusted to lie with the marking point of the stylus in a plane perpendicular to the bar 10.

By the provision of the means for adjusting the location of the hairline carrying window this accurate positioning of the hairline with respect to the point of the stylus can be maintained even though a slight inaccuracy might occur in the construction of the device or by reason of an accident which might throw the stylus out of its perpendicular relation with the bottom of the cursor. In any such event by loosening the thumb screws 38 the hairline position can be adjusted, after making necessary measurements to set it at exactly the same distance from the zero point of the scale as the point of the stylus lies from the point of the zero aligned pointed member 24.

The stylus 42 may be in the form of a pointed solid steel pin or it may be in the form of any suitable type of mark producing implement such as a pencil, a ruling pen or the like.

A preferred construction for the stylus 42 is as illustrated wherein there is provided a tubular sheath 43 which is slightly tapered at its lower end as indicated at 44 with a small lower end opening 45. The other or opposite end of the sheath 43 is open and may be constructed in any suitable manner to secure it in the socket 41 as, for example, the socket may be threaded and the end of the sheath provided with corresponding threads so that it can be threaded into the socket.

The numeral 46 designates a flexible tube designed to fit in the sheath and of approximately the same length as the interior of the sheath and carrying a marking tip 47 of the nature of the well known "ball point" marker.

The form of the stylus illustrated and described conforms to a type of writing implement of known construction which employs what is described as "liquid lead" which is fed from the point 47. By the use of this type of marking stylus it will be readily seen that the tip or point which forms the mark is always accurately in the line of the axis of the stylus.

It is anticipated also that an inking element may be used as a stylus which could utilize either permanent or erasable ink.

Means is provided upon the top part of the cursor for holding it firmly in a set position and also for expediting the adjustment of the cursor on the slide.

Two forms of holding and quick release means are here illustrated.

In the construction shown in Fig. 1 the top part or head 30 of the cursor is provided with the opening 48 in which is located for relatively loose up-and-down movement, a friction block 49, the length of which approximates the length of the opening. This friction block carries the two aligned oppositely directed guide pins 50 and these pins are located, for up-and-down movement with the friction block, in upwardly opening guide notches 51.

The friction block 49 is constantly urged downwardly for engagement with the narrow top surface 18 of the scale bar, by a pair of springs, each of which is generally designated 52. These springs are located one on each side of the block 49 and each comprises a central inverted U-shaped portion 53 which engages over or hangs down from a guide pin 50. Each side of this U-shaped portion extends downwardly and laterally as indicated at 54 and terminates in the outwardly extending upwardly arched finger 55 which presses against the under side of the overlying portion of the head part 30 of the cursor body as is clearly illustrated in Fig. 4. Thus the oppositely directed terminal finger portions of each of the springs presses upwardly against the under side of the adjacent portion of the head part 30 and exerts a downward pull on the center part 53 and the pin over which it engages. The friction block being pulled down by the two springs 52 thus maintains a constant frictional engagement with the friction surface forming the narrow top face 18 of the scale bar and by this means the cursor or slide is held against accidental movement.

In order to effect the quick release of the friction block from engagement with the scale bar there is provided the quick release member which is generally designated 56.

The member 56 comprises a curved arm 57 from one end of which extends the relatively wide fork. The two arms of tines comprised in the fork, are widely spaced so as to straddle the top of the cursor body as shown in Fig. 3 and each arm is suitably apertured to receive a guide pin 50.

The arms 58a of the fork are angled as indicated at 58b and each of these angle portions is pivotally mounted upon a pivot pin 59 projecting laterally from each side of the cursor at the top of the latter as is clearly shown in Fig. 1. Thus the arm 57 extends upwardly and outwardly and the fork arms or tines 58a extend to and are pivotally attached to the friction block by means of the pins 50. By pressing downwardly with the finger upon the arm 57 it will be seen that the cursor friction block will be lifted slightly against the resistance of the springs 52 to disengage the block from the surface 18 so that the cursor or slide can be readily shifted.

Figs. 6 and 7 illustrate another embodiment of the quick release means for the cursor.

In these figures the scale bar is generally designated 10a and the cursor is generally designated 26a.

The cursor 26a may be of any style or construction. For example, it may be formed in the same manner as the cursor 26 or it may be formed as shown in Fig. 6 where it embodies a rigid frame having top and bottom portions 60 and 61 respectively connected by side bars 62. Between each pair of side bars 62 the transparent hairline carrying window pane 63 may be secured.

In this second embodiment the scale bar has formed along its top surface a toothed rack 64, the teeth of which are formed for engagement with the teeth of a helical geared roller 65 supported for up-and-down movement in the top part 60 of the cursor in the same manner as the friction block 49 is supported and urged downwardly toward the rack 64 by springs of similar construction.

For elevating the helical geared roller 65 to permit the quick or rapid adjustment of the cursor on the scale bar there is provided the quick release unit, generally designated 66, which is of the same construction and connected with the gear in the same manner as the unit 56 is constructed, pivotally mounted and connected with the friction block 49.

Since the mounting, together with the spring urging means and the quick release means for the helical geared roller are the same as that shown in connection with the friction block no detailed description of the construction is given or believed to be necessary. It will, of course, be understood that either type of quick release holding means may be used on either of the two types of scale bars illustrated.

It is also to be understood that the cursor in either of the constructions illustrated may be used upon any type of scale such as an ordinary foot rule, a slide rule or any type of long beam scale such as is employed in mold lofts or other places where large drawings are laid out.

As it is believed to be readily apparent, in the use of the invention the fixed point 24 can be employed for holding the zero end of the scale bar in position while measurements are marked off on a drawing by the marking stylus 42 or the position of the scale bar can be held while arcs are struck or circles formed by the marking stylus, by a bow pen or any other instrument. Where a number of measurements are to be laid off it will be seen that the cursor can be easily and quickly released so that it can be rapidly shifted from one position to another.

I claim:

1. A geometrical instrument comprising a beam having a longitudinal face carrying a scale, means forming a centering point carried by the beam adjacent to one end with reference to an end indicium of the scale, a slide member mounted on the beam for movement longitudinally therealong and embodying a transparent part overlying the scale and carrying an index line for coaction with the scale, a stylus carried by the slide and extending in the same direction from the beam as and parallel with the centering point, said stylus having its point in the plane which extends transversely of the beam and contains said index line, means carried by the slide member for connection with the beam for holding the slide member in a set position on the beam, the last named means comprising a body movable toward and away from the beam and including opposite pins movable in slots in opposite side portions of the slide member, resilient means coupling at least one of said pins with an adjacent part of the slide member and urging the said body toward and into engagement with the beam, and means for moving the said last named means against the action of the resilient means away from the beam to facilitate free and rapid adjustment of the slide on the beam.

2. The invention according to claim 1, wherein the said means carried by the slide for connection with the beam comprises a friction member having friction contact with an opposing surface of the beam.

3. The invention according to claim 1, wherein the said means carried by the slide for connection with the beam comprises a toothed wheel and a toothed rack carried by the beam along a longitudinal face thereof, said wheel being fully disengageable from the rack for effecting said free and rapid adjustment of the slide.

4. A geometrical instrument comprising a scale, a slide thereon, means at one end of the scale for holding such end in a set position on a drawing surface, said slide embodying two opposite side panels and top and bottom parts connecting the panels, a stylus carried by said bottom part, one of said panels having a window opening, a transparent window pane in said opening having a hairline thereon, means for adjusting the window pane in said opening to bring the hairline in the plane which extends transversely of the beam and contains the point of the stylus, and means for securing the slide against movement on the scale.

5. The invention according to claim 4, wherein the said window opening is fully open on the side nearest to the first stated means whereby the scale is fully viewable from the hairline of said transparent window panel to said first means.

6. The invention according to claim 4, wherein said stylus embodies a tubular sheath detachably coupled at one end to the bottom part of the slide and having the opposite end opened and tapered and marking fluid carrying container in the sheath and carrying a marking point projecting through said tapered open end of the sheath.

7. The invention according to claim 4, wherein the said window opening is fully open on the side nearest to the first stated means, the panel at the opposite side of the opening having a recess into which the window pane is slidably extended and the top and bottom edges of the window opening being slotted to receive the top and bottom edges of the window pane, and means for securing the window pane in adjusted position in the window opening.

8. A geometrical instrument comprising a scale bar, a slide thereon embodying spaced side panels and top and bottom parts connecting the panels, one of said panels having a window opening, a transparent pane in said opening carrying a hairline for coaction with the scale, said top part having an opening therein, a slide securing member positioned in said top part opening, means coupling said member with the slide at opposite sides of the top part opening for movement toward and away from an adjacent surface of the scale bar, resilient means between the scale bar and said member urging the member into operative connection with the scale bar to secure the slide in position on the bar, and means carried by the slide and coupled with said member for moving the member away from the scale bar against the action of said resilient means.

9. The invention according to claim 8, wherein said member comprises a friction body having a friction surface held in frictional engagement with an adjacent surface of the scale bar.

10. The invention according to claim 8, wherein said member comprises a toothed wheel, and a toothed rack carried by the scale bar with which said toothed wheel is connected.

11. The invention according to claim 8, wherein the last stated means comprises an arm having a forked end in straddling relation with the top of the slide and the said member, said forked end comprising spaced arms pivotally coupled with said member, and a pivot between the forked end and the slide.

12. The invention according to claim 8, wherein the said means coupling the member with the slide comprises pins projecting from opposite sides of the member, slots in the slide at opposite sides of said top part opening, and wherein said resilient means comprises to elongate springs having said member positioned therebetween, each of said springs comprising a central inverted U-shaped portion engaged over a pin and oppositely extending terminal portions each forming an extension of one side of the U-shaped portion and engaging against the under side of said top part.

References Cited in the file of this patent

UNITED STATES PATENTS

| 242,895 | Derby | June 14, 1881 |
| 2,106,398 | Bartusch | Jan. 25, 1938 |
| 2,499,673 | Olejniczak | Mar. 7, 1950 |
| 2,512,042 | Stern | June 20, 1950 |

FOREIGN PATENTS

| 21,065/12 | Great Britain | Jan. 30, 1913 |
| 489,571 | France | Feb. 20, 1919 |